June 12, 1956  O. G. LELLEP  2,750,274
METHOD OF HEATING GAS PERMEABLE MATERIAL
WITH A LEAN GAS MIXTURE
Filed July 2, 1953  2 Sheets-Sheet 2

Inventor
Otto G. Lellep
by Wayne B. Easton
Attorney

United States Patent Office 2,750,274
Patented June 12, 1956

2,750,274

**METHOD OF HEATING GAS PERMEABLE MATE-
RIAL WITH A LEAN GAS MIXTURE**

Otto G. Lellep, Wauwatosa, Wis., assignor to Allis-
Chalmers Manufacturing Company, Milwaukee, Wis.

Application July 2, 1953, Serial No. 365,751

5 Claims. (Cl. 75—5)

This invention relates to a new and improved method of heat hardening, burning, roasting or sintering various materials such as iron ores on a gas permeable grate. The material so treated may be granular, or in the form of small briquettes, nodules or pellets, or in a fluffed powdery form, said material being capable of forming a layer or bed having gas interstitial permeability.

The method of the present invention is suitable for various applications, one specific useful application disclosed herein by way of example being in connection with the heat hardening of pellets formed of moist, concentrated, finely divided magnetic iron ore obtained from the beneficiation of low grade iron ores known as taconites. Other applications would include the desulphurization of sulphur-containing ores and heat treatment of iron carbonate ore, minerals including phosphate minerals, and other chemical products.

The beneficiation of low grade iron ores involves fine grinding of the ore with the result that the beneficiated product is in a state of subdivision too fine to be directly usable in a blast or open hearth furnace and hence requires the practice of some type of agglomerating operation whereby the fine particles may be formed into masses of a size and structure usable in these furnaces. One operable mode of so agglomerating fine particles of iron ore is to form the particles into pellets and heat hardening the pellets on a gas permeable grate by heating the pellets to a temperature near to but below the incipient melting point of the ore. Although there are known methods of heating the pellets to the desired temperature, an object of the present invention is to provide a new and improved method of heating iron ore pellets which, in addition to being economical with respect to the fuel requirement and the apparatus utilized in practicing the method, produces a highly superior product suitable for charging in blast and open hearth furnaces.

The total heat requirement for heat treating various materials such as iron ores in accordance with the method of the present invention is supplied partially by "combustible components" contained in the material and partially by "external fuel." The term "combustible components" as used herein pertains to all components in the material which are capable of burning, that is, evolving heat upon being oxidized. The term "combustible components" thus includes added fuel such as finely divided coal and/or combustible components contained in the ore in its natural form, that is, the form in which the ore is found in nature. The fuel such as finely divided carbon may be admixed with the material or associated with the material in a variety of known ways. The term "external fuel" as used herein pertains to oil, gas, coal, or other fuel supplied in suitable form with suitable apparatus for burning it to supply a portion of the total heat requirement for heat hardening the iron ore pellets.

In general, it is known that materials such as concentrated iron ores can be heated on a grate to desired temperatures by either of two heating principles. These are referred to herein as the "heat wave" principle and the "heat front" principle. The method of the present invention involves a new and improved modification of the "heat wave" principle but both heating principles are described herein to facilitate a better understanding of the invention. Both of these heating principles may be utilized to heat a material to a desired temperature on a stationary or traveling gas permeable grate but for convenience these heating principles will be explained in connection with a traveling gas permeable grate.

The "heat front" principle is utilized when the material to be heat treated contains insufficient combustible components to sustain combustion and effectively raise the temperature of the material to the desired temperature after an upper portion or zone of the layer of material has been ignited and air is subsequently drawn downwardly through the layer. With this principle the material to be heat treated, such as concentrated iron ore, either in the form of pellets, small briquettes or in a fluffy finely divided state, is deposited in a layer at one end of a traveling grate. After passing through a predrying chamber the layer of material on the grate is subjected to a downdraft of white hot flame in a long heating chamber equipped with suitable burners. The flame is drawn downwardly through the layer of material by a suction device and heats the layer of material from the top down. The "front" of the heated zone progresses downward until the layer of material is heated throughout. When the "heat front" principle is utilized the heating chamber occupies about one-half the total length of the grate, the heating chamber being of sufficient length relative to the speed of the grate and the thickness of the layer of material so that the bottom portion of the layer of material is subjected to hot gases of combustion for a sufficient length of time to be heated to the desired temperature. With a layer of pellets formed of magnetite iron ore the temperature gradient from the top surface of the layer to the bottom surface may range, for example, from 2450° F. at the top to 2200° F. at the bottom. Although the combustible components present in the material may be consumed, much of the total heat requirement for heating the material to the desired temperature with the "heat front" principle is supplied by external fuel.

The "heat wave" principle is utilized when the material to be heat treated contains sufficient combustible components to sustain combustion and effectively raise the temperature of the material to the desired temperature after the top portion of the layer of material has been ignited and air is subsequently drawn downwardly through the layer. The "heat wave" principle was first introduced by Dwight-Lloyd in connection with their sintering process. With this principle the material to be heat treated is deposited in a layer at one end of a traveling grate. After passing through a predrying chamber the layer of material on the grate is subjected to a downdraft of flame in a relatively short ignition chamber and, as the combustible components contained in the material are sufficient to sustain combustion in the material, it is only necessary to ignite and establish a relatively narrow burning zone at the top of the layer of material. The layer of material, having the top portion thereof ignited in the ignition chamber, passes beyond the end of the ignition chamber where atmospheric air is caused to be drawn downwardly through the layer of material with a suction device. As the combustible components in the material itself are sufficient to sustain a heat producing reaction, the current of air drives the burning zone progressively downward as a wave until the entire thickness of the layer of material has been traversed. The temperature of the burning zone remains substantially constant as it traverses the layer of material. The material on the upstream side above the burning zone, where the burning has already been completed, is cooled by the flow of air. The material on the downstream side below the burning zone becomes heated by hot products of combustion and air that becomes heated in the burning zone. Although external fuel is required to ignite the top surface of the layer of material in the "heat wave" principle, all of the heat required to sustain combustion as the burning zone moves progressively downward through the layer of material is supplied by the combustible components of the material treated.

The ignition chamber utilized with the "heat wave" principle is similar in general appearance to the heating chamber utilized with the "heat front" principle except that the length of the ignition chamber utilized with the "heat wave" principle is much shorter. The reason is that with the "heat wave" principle it is only necessary that the upper surface of the layer of material be ignited by the flame, as the layer moves through the ignition chamber, to establish a relatively narrow burning zone. In the "heat front" method, however, the entire layer of material must be heated to the desired temperature from the top surface of the layer of material to the bottom surface during the time the layer is in the heating chamber. When possible it is therefore desirable to use the "heat wave" method because the smaller size of the ignition chamber is less costly than the relatively larger heating chamber which must be utilized with the "heat front" principle. Another advantage of the "heat wave" principle is that the entire layer of material is heated to the substantially same temperature whereas with the "heat front" principle the top portion of the layer of material is necessarily heated to a somewhat higher temperature than the bottom portion as explained above.

Most materials such as ores do not contain sufficient combustible components in their natural form to support combustion by merely passing air through a layer of the material. In prior art processes the "heat front" principle is used to heat such materials to the desired temperature or, when it is desired to use the "heat wave" principle, a sufficient amount of fuel such as powdered coal is mixed with the material to increase the amount of combustible components in the material so that combustion can be supported by merely passing air through the material. A disadvantage of the practice is that the powdered coal must be added in predetermined exact quantities and the cost of operation is thereby increased because of the extra equipment and labor required.

In view of the background information presented above, an object of the present invention is in providing a new way of utilizing the "heat wave" principle for heat treating certain materials such as iron ores which do not contain sufficient combustible components in their natural form to support combustion when air alone is passed through a layer of the material.

More specifically, an object of the invention is to provide a method in which materials with insufficient amounts of natural combustible components can be heat treated with the "heat wave" principle without admixing or otherwise adding solid fuel such as powdered coal to the layer of material which is to be heat treated. By omitting an admixed fuel such as finely divided coal from iron ore when the ore is formed into pellets prior to heating the pellets, the resulting pellets have a more uniform structure and are about twice as strong as pellets heat hardened with the aid of admixed coal. It is accordingly another object of the invention to provide a new and improved method for heat hardening iron ore pellets in which the internal structure of the resulting pellets is more uniform and the resulting pellets are stronger and harder than pellets which are heat hardened with the aid of an admixed fuel.

The following is a full and clear description of the method of the present invention and the best mode devised by the inventor for realizing its advantages. Reference is made in the description to the drawings in which.

Figure 1:
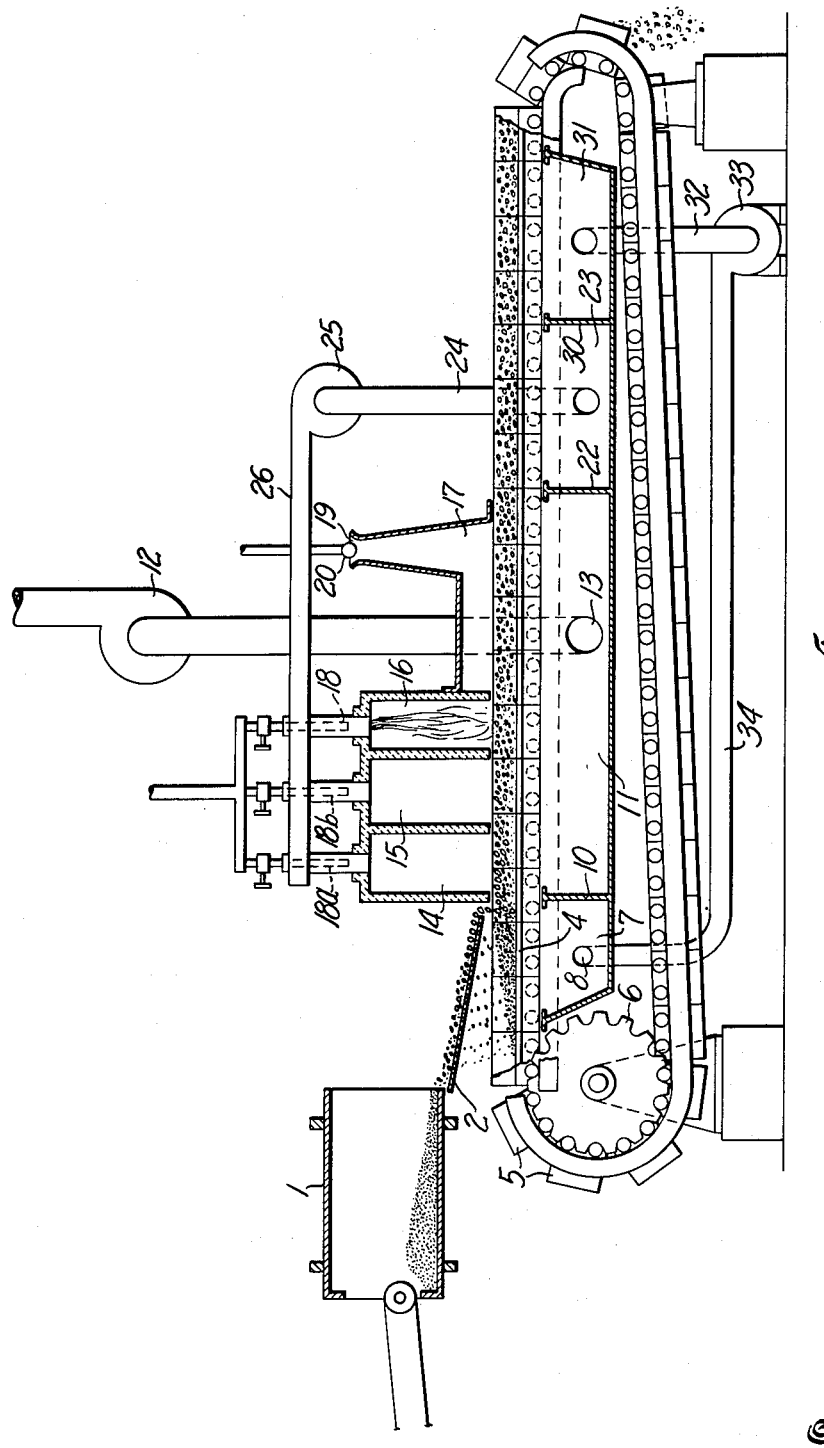
Fig. 1 is a more or less schematic view of apparatus with which the invention may be practiced shown partially in section on a vertical plane.

The method of the present invention may be utilized for various metallurgical or chemical heating applications such as heat hardening concentrated iron ore pellets and for burning, roasting and sintering various other materials. The material treated may be in crushed granular form, may be powdery and in a fluffed state as a result of fine grinding, or may be nodules, briquettes or pellets formed from a powdery material such as a finely divided concentrated ore.

For convenience, the method is described as it would be practiced on the unidirectional traveling grate shown in the drawing. It is to be understood that apparatus other than the specific apparatus shown in the drawing, including apparatus for batch operation, may also be utilized to practice the method as will be clearly apparent to persons skilled in the art to which it appertains.

The method of the present invention is described and illustrated hereinafter, by way of example, in connection with the transformation of concentrated magnetic iron ore into heat hardened pellets suitable for charging into a blast or open hearth furnace.

Magnetic iron ore, in the form it is found in nature, contains a considerable amount of combustible components, in the sense that the term is used herein, because it is oxidizable in a heat releasing reaction into hematitic oxide. For pure magnetite ($Fe_3O_4$), the heat released when it is oxidized to hematite ($Fe_2O_3$) is about 150 B. t. u. per pound of hematite produced. If pellets formed of concentrated magnetic iron ore were to be heat hardened by subjecting them to an oxidizing flame ranging from 2200° F. to 2450° F., the heat released in oxidizing the magnetite would amount to about one half of the total external heat required. But the heat released in oxidizing the magnetite would not be sufficient to sustain combustion and raise the temperature of the ore to the desired temperature when air alone is passed through a layer of the pellets after the top surface of the layer is ignited as with a flame. As the oxidizing of magnetite does not release sufficient heat, the "heat front" principle could be utilized to heat harden a layer of magnetite pellets or, if it is desired to use the "heat wave" principle, a sufficient amount of finely divided solid fuel could be admixed with the magnetite prior to forming the pellets to increase the amount of combustible components a sufficient amount so that combustive reaction could be supported merely by passing air through a layer of pellets after the top surface of the layer is ignited.

In the method of the present invention, which is described in detail hereinafter, pellets formed of concentrated magnetic iron ore are heat hardened by utilizing the "heat wave" principle without admixing or otherwise adding carbon or other fuel with the magnetite to increase the amount of combustible components as will be fully described hereinafter.

Concentrated magnetic iron ore may be obtained by the beneficiation of magnetic taconites by magnetic separating means. This material is ordinarily produced in the form of a moist filter cake. Referring to Fig. 1, the moist filter cake is introduced into a balling drum 1 of known construction in which the filter cake is formed into water bound balls or pellets. From balling drum 1 the pellets are deposited on a screening device 2 of known construction. Pellets larger than the openings in the screen surface pass over the end of screening device 2 and are deposited on the feed end of a traveling, gas permeable grate 4 of the endless type. Pellets smaller than the openings in the screen surface pass through the screen surface and are deposited onto grate 4 in advance of the larger pellets. Grate 4 has side plates 5 for retaining a layer of the pellets deposited on the grate. The layer of pellets, which is continuously maintained at a uniform depth, moves to the right with the grate 4. Grate 4 is mechanically moved by a power driven sprocket 6.

A wind box 7 closed at the top by gas permeable grate 4 is provided at the feed end of the traveling grate machine. The pellets deposited on the grate may have a moisture content as high as 10 percent and a preliminary drying of the lowermost pellets to a moisture content of 7 or 8 percent to increase their strength to the extent that they can support the pellets in the top portion of the layer is desirable. This is accomplished by conveying moderately heated air from another part of the process through a conduit 34, and through a port 8 in box 7, upwardly through the pellets on the grate above wind box 7.

The illustrated traveling grate machine is provided, adjacent wind box 7 and separated therefrom by a wall 10, with a suction box 11 closed at the top by gas permeable grate 4 and equipped with exhaust fan 12 for discharging gases from suction box 11 through a port 13 to the atmosphere. Directly above suction box 11, and separated therefrom by grate 4, are four hooded chambers comprising a drying chamber 14, a preheating chamber 15, an ignition chamber 16 and a combustion supporting chamber 17. The space along grate 4 occupied by successively positioned hooded chambers 14, 15, 16 and 17 is substantially coextensive with the length of suction box 11 so that gases from these four chambers are drawn through the layer of pellets on grate 4 into suction box 11. A fuel supply inlet or nozzle 18 provided in ignition chamber 16 is arranged to project an external fuel such as gas, oil or powdered coal into ignition chamber 16 to be burned therein for flame production. Fuel supply inlets 18a and 18b are provided for chambers 14 and 15 for use when the machine is started but fuel is not supplied through these inlets during normal operation of the machine. A supply of air to support combustion in chambers 14, 15 and 16 is conveyed through conduit 26 from another part of the process as will be explained hereinafter.

Figure 2:
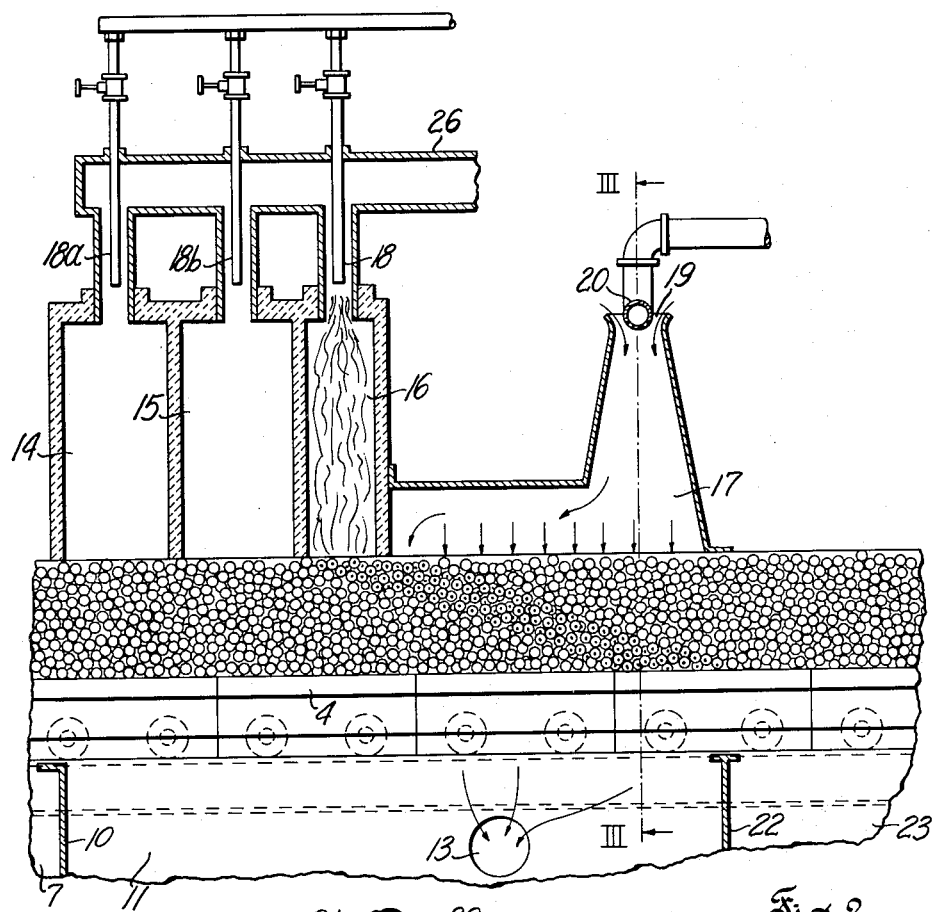
Fig. 2 is an enlarged view of a portion of the apparatus of Fig. 1 shown in section on a vertical plane.
Figure 3:
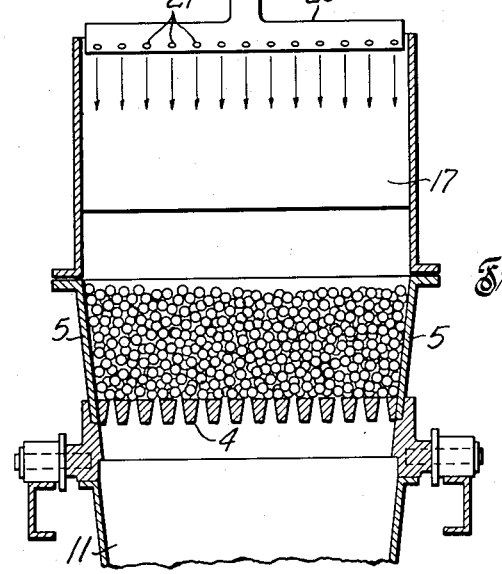
Fig. 3 is a sectional elevation taken on line III—III of Fig. 2.

Combustion supporting chamber 17, shown in detail in Figs. 2 and 3, is formed with a slot like opening 19 extending transversely of grate 4 through which atmospheric air may be drawn into chamber 17. A fuel inlet pipe 20 extends transversely of grate 4 and is mounted within the confines of opening 19. Fuel inlet pipe 20 is provided with a plurality of ports 21 through which a gaseous fuel is discharged and homogeneously mixed with atmospheric air drawn through opening 19 into chamber 17. It is also within the scope of the invention that a finely divided solid fuel could be introduced and mixed with air in chamber 17. The ratio of fuel to air in chamber 17 is normally very small or lean relative to the rich fuel to air mixture utilized in ignition chamber 16.

Adjacent suction box 11, and separated therefrom by a transverse wall 22, is a second suction box 23 closed at the top by grate 4. Connected to suction box 23 through a conduit 24 is exhaust fan means 25, the discharge of which is connected by conduit 26 with drying chamber 14, preheating chamber 15 and ignition chamber 16. Exhaust fan 25 functions to draw atmospheric air downwardly through the layer of heated pellets above suction box 23 and convey the resultant heated air in apportioned amounts to hooded chambers 14, 15 and 16. Suitable valve means (not shown) are provided in conduit 26 which may be controlled and regulated in a known manner to apportion the amounts of resultant heated air delivered to chambers 14, 15 and 16.

Adjacent suction box 23, and separated therefrom by a transverse wall 30, is a third suction box 31 closed at the top by grate 4. Connected to suction box 31 through a conduit 32 is exhaust fan means 33 which functions to draw atmospheric air downwardly through the layer of heated pellets above suction box 31 and deliver the resultant heated air to wind box 7 through a pipe 34 for predrying the material on grate 4 above wind box 7.

The method of the present invention is specifically illustrated hereinbelow in connection with the heat hardening of green pellets formed of finely divided, concentrated magnetic iron ore.

Magnetic iron ore pellets which preferably range in size from three eighths to five eighths of an inch are deposited from the screening device 2 onto grate 4 in a thick layer, the layer preferably being in the neighborhood of twelve to eighteen inches in depth. While moving through drying chamber 14 and preheating chamber 15 the pellets are successively dried and preheated by heated gases delivered through conduit 26 from fan 25 and drawn downwardly through the layer of pellets by exhaust fan 12.

Suitable fuel entering ignition chamber 16 through the fuel supply inlet 18 is burned in a supply of heated air from conduit 26 to create an ignition flame preferably having a temperature of about 2450° F. in ignition chamber 16. The ignition flame is drawn or projected downwardly into the moving layer of pellets by exhaust fan 12 so as to heat the layer of pellets passing through ignition chamber 16 to white heat at the top. With the fuel and air supply to ignition chamber 16 properly coordinated with the grate speed, a white hot portion or burning zone of two or three inches in depth with a temperature between the limits of 2200 and 2450° F. is established at the top of the layer of pellets, i. e., adjacent the surface of the layer penetrated by the flame, before the pellets leave ignition chamber 16. The heated portion of the layer of pellets in chambers 16 and 17 is indicated schematically in Fig. 2 by circles having dots at the centers.

The layer of pellets with the burning zone established at the top of the layer passes beyond the end of ignition chamber 16 into chamber 17 where a very lean, homogeneous mixture of a fuel and air, the fuel being propane, natural gas, producer gas or some other gaseous or powdered fuel, is drawn downwardly through the layer of pellets into suction box 11. The air for the mixture is drawn through opening 19 of chamber 17 and the fuel is delivered through fuel inlet pipe 20 which has a plurality of ports 21, the air and fuel thus being intimately mixed to form a homogeneous mixture. The fuel and air mixture should be sufficiently lean so as to be non-flammable at 60° F., i. e., the mixture becomes flammable only when its entire mass is raised to such a temperature above 60° F. that the heat of combustion is evolved faster than it is lost to the surrounding.

In heat hardening magnetite pellets, for example, a suitable fuel to air mixture consists of 0.6 part propane to 99.4 parts air by volume. The propane content of this mixture is considerably below 2.10 percent, which is the lower limit of flammability for a mixture of propane and air, and does not burn intensively until the mixture is heated to about 1800° F. The heat of combustion of the mixture is sufficient to raise the temperature of the mixture only about 750° F. The temperature of the propane and air mixture in chamber 17 before the mixture penetrates the layer of hot pellets is about 60° F., the same temperature as the atmospheric air of which the mixture is largely composed. Combustion however takes place because the pellets in the heated portion are at a high temperature above the temperature at which the combustion of the mixture is initiated in the presence of the heated material, the latter temperature being below 2200° F.

Stated differently, a flammable gas mixture, in order to support a flame, must be raised to a predetermined temperature, which is called ignition temperature. This is defined in "Fuels and Their Combustion" by R. T. Haslam and R. T. Russell, McGraw-Hill, 1926 edition, page 261, as follows:

"If a combustible gas-air mixture is heated gradually, the velocity of combustion at first increases regularly but fairly slowly as the temperature is raised. Finally, however, the ignition temperature is reached, chemical combination is not dependent on heat from external sources, and practically instantaneous combustion occurs. The ignition temperature is the lowest temperature at which this rapid combustion will take place, and may be defined as the temperature at which heat is generated by combustion faster than heat is lost to the surroundings, and combustion thus becomes autogenous or self-propellent. Below this temperature the gas-air mixture will not burn freely and continuously unless heat is supplied. The actual ignition temperature of a gas is, therefore, seen to depend on surrounding conditions, but the term as ordinarily applied is used to signify the temperature at which rapid combustion occurs in ordinary air."

In view of the foregoing definition, it may be stated that the combustion of the gas mixture prior to its introduction into and heating to substantially 1800° F. by contact with the portion of the layer in which said pellets are heated to a high temperature ranging from 2200° F. to 2450° F. is nonself-propellent or nonself-propagating, the temperature of the introduced gas being relatively low, preferably at about the temperature of the surrounding atmosphere.

As the layer of pellets enters chamber 17 the lean mixture of propane and air penetrates into the layer of hot pellets until the mixture itself heats to about 1800° F., whereupon combustion of the mixture takes place. The temperature of the top surface of the layer of pellets as the moving layer traverses chamber 17 decreases gradually from a white heat temperature because the propane and air mixture acts as a coolant, whereas the temperature of the pellets in the remainder of the layer, i. e., beneath the heated portion, increases gradually due to the flow of the combustion products therethrough. As previously indicated the mixture itself becomes heated by contact with the pellets above that part of the heated portion wherein combustion of the mixture is taking place but the mixture does not burn completely until it becomes heated to about 1800° F. and contacts the surfaces of the white hot pellets which act as catalysts for the combustion of the mixture. The combustion of the mixture in contact with the surfaces of the white hot pellets drives the heated portion downwardly while maintaining the pellets in the heated portion at a temperature ranging from about 2200 to about 2450° F. for magnetic iron ore pellets. As the mixture approaches the white hot pellets in the heated portion and becomes heated, small amounts of the mixture may be burned or consumed just prior to contacting the white hot pellets. In substance, the heat released in burning the propane serves to supplement the heat released in the oxidizing of magnetite to hematite such that the total heat released from both these sources is sufficient to maintain the pellets in the heated portion at the desired temperature.

The air in the gaseous fuel and air mixture contains sufficient oxygen to support the oxidation of the magnetite and the burning of the gaseous fuel. The flow of the gaseous fuel and air mixture is so regulated relative to the speed of the grate and the length of space between the ignition chamber 16 and wall 22 which separates suction boxes 11 and 23, that the burning zone will have entirely traversed the layer of pellets, in a wave like sense, at wall 22. In other words, combustion of the mixture effects a movement of the heated portion progressively transversely through the entire layer while maintaining the material in said portion at the desired temperature and in an oxidizing atmosphere. It is of course understood that the temperature differences between the pellets in the heated portion and the pellets immediately above and below the such portion are not sharp but are more or less gradual.

Thus, a small amount of gaseous fuel, such as propane, mixed with air and passed through the layer of pellets after the top surface of the layer is ignited, permits the "heat wave" principle of heat treatment to be utilized for heat hardening magnetite pellets without admixing or otherwise associating a solid fuel such as finely divided coal with the magnetite.

As the layer of pellets leaves chamber 17 the upper portion of the layer, already cooled somewhat by being subjected to the cooling effect of the mixture of gaseous fuel and air flowing through the layer in chamber 17, is further cooled with air drawn downwardly through the layer into suction box 23. The air drawn into suction box 23 becomes heated by absorbing the major part of the heat left in the heat hardened pellets and is delivered in apportioned amounts for drying pellets in chamber 14, preheating pellets in chamber 15, and for supporting combustion of the ignition flame in ignition chamber 16. A portion of the residual heat remaining in the layer of pellets is withdrawn therefrom as the layer moves over suction box 31 by atmospheric air drawn downwardly through the layer into suction box 31 by fan 33. Fan 33 delivers the resultant heated air to wind box 7 through pipe 34 for the preliminary drying of the pellets at that stage.

In summary, the method of the present invention is applicable mainly for certain materials which have only a slight amount of combustible components in the form the material is found in nature. The heat released in burning the fuel of the lean fuel and air mixture in the heated portion of the layer of material, the mixture being nonflammable at 60° F., serves to supplement the heat released in oxidizing or burning the combustible components of the material. The total heat from both these sources must of course be sufficient to sustain combustion in the burning zone of the layer of material at the desired temperature. If the amounts of combustible components in the material is relatively small or entirely lacking, the fuel to air ratio of the mixture in chamber 17 must be correspondingly greater so that the total heat requirement is supplied. There is a practical limitation, however, on how "rich" the fuel to air ratio of the mixture supplied in chamber 17 may be which is dependent upon the lower flammability limit of the mixture. It is essential in the present invention that no substantial burning of the gaseous fuel and air mixture should occur before the mixture reaches the heated portion of the layer of material under chamber 17. Thus, if the total heat requirements made it necessary that the gaseous fuel and air mixture be above the lower flammability limit so that the mixture starts to burn in chamber 17 before reaching the top surface of the layer of material or burns completely before reaching the burning zone, the purpose of the invention would be defeated. In that case it would be necessary to utilize the "heat front" method as described hereinabove.

Although the apparatus illustrated in the drawing is arranged so that the flow of gases in chambers 14, 15, 16 and 17 is downwardly through the layer of material, it will be understood that according to the present invention the apparatus could also be arranged so that the flow would be in the reversed direction. Likewise, hoods could be provided over wind boxes 23 and 31 so that the flow of gases through the layer of material at those points could also be reversed from the direction illustrated in a known manner. It will also be understood that the method can be practiced with a stationary grate or with apparatus such as a traveling grate in which the layer of material is caused to move through appropriate chambers. If apparatus is provided in which the layer of material is caused to move through appropriate chambers the direction of movement may be horizontal, inclined or vertical within the scope of the invention.

It will be understood that the method of the present invention is subject to variations and modifications without departing from the spirit of the invention, and that it is not limited to the temperatures, dimensions and other quantities mentioned by way of illustration but only by the scope of the appended claims.

It is claimed and desired to secure by Letters Patent:

1. A method of successively heating all portions of a mass of granular material without admixed fuel to a predetermined high temperature, said material containing insufficient combustible components to sustain combustion without the application of external heat, said method comprising the steps of forming the material into a generally horizontal layer having gas interstitial permeability, causing a hot flame to penetrate a surface of said layer to establish in said layer a burning zone portion initially positioned adjacent said surface, said burning zone portion comprising said material heated to said high temperature, and subsequently passing a lean low temperature mixture of fuel and air under pressure, the combustion of said mixture being nonself-propagating at said low temperature, transversely into said portion for heating said mixture and then effecting combustion thereof in the presence of the heated material and for urging the products of combustion transversely through the remaining portions of said layer, said high temperature being above the temperature at which the combustion of said mixture is initiated in the presence of the heated material and below the incipient melting point of said material, said combustion of said mixture effecting movement of said burning zone portion progressively transversely through the entire layer from said surface thereof while maintaining the material in said burning zone portion at said high temperature and in an oxidizing atmosphere.

2. A method of successively heating all portions of a mass of granular material without admixed fuel to a predetermined high temperature, said material containing insufficient combustible components to sustain combustion without the application of external heat, said method comprising the steps of providing a hot flame and a low temperature stream of a lean mixture of fuel and air under pressure, said flame and said fuel and air mixture being positioned adjacent to each other in spaced relationship, the combustion of said mixture being nonself-propagating at said low temperature, forming the material into a generally horizontal layer having gas interstitial permeability, and moving said layer generally horizontally relatively to said flame and stream so that a surface part of said layer is presented successively to said flame and said stream in the order named, said flame penetrating said surface part of said layer to establish in said layer a burning zone portion initially positioned adjacent said surface part, said burning zone portion comprising said material heated to said high temperature and said stream then passing into said portion for heating said mixture and then effecting combustion thereof in the presence of the heated material and for urging the products of combustion transversely through the remaining portions of said layer, said high temperature being above the temperature at which the combustion of said mixture is initiated in the presence of the heated material and below the incipient melting point of said material, said combustion of said mixture effecting movement of said burning zone portion progressively transversely through the entire layer from said surface part thereof while maintaining the material in said burning zone portion at said high temperature and in an oxidizing atmosphere.

3. A method of successively heat hardening all portions of a mass of concentrated iron ore pellets without admixed fuel, said pellets containing insufficient combustible components to sustain combustion without the application of external heat, said method comprising the steps of forming the pellets into a generally horizontal layer having gas interstitial permeability, establishing in said layer a burning zone portion positioned adjacent a surface of said layer to a high temperature range of about 2200° F. to 2450° F., and subsequently passing a lean low temperature mixture of fuel and air under pressure, the combustion of said mixture being nonself-propagating at said low temperature, transversely into said burning zone portion of said layer for heating said mixture and then effecting combustion thereof in the presence of pellets heated to a temperature within said range and for urging the products of combustion transversely through the remaining portions of said layer, the temperature at which the combustion of said mixture is initiated in the presence of the heated pellets being below 2200° F., said combustion of said mixture effecting movement of said burning zone portion progressively transversely through the entire layer from said surface thereof while maintaining the pellets in said burning zone portion at a temperature ranging from about 2200° F. to 2450° F. in an oxidizing atmosphere.

4. A method of successively heat hardening all portions of a mass of concentrated iron ore pellets without admixed fuel, said pellets containing insufficient combustible components to sustain combustion without the application of external heat, said method comprising the steps of forming the pellets into a generally horizontal layer having gas interstitial permeability, causing a hot flame to penetrate a surface of said layer and establish in said layer a burning zone portion initially positioned adjacent said surface to a high temperature range of about 2200° F. to 2450° F., and subsequently passing a lean low temperature mixture of fuel and air under pressure, the combustion of said mixture being nonself-propagating at said low temperature, transversely through said burning zone portion for heating said mixture and then effecting combustion thereof in the presence of pellets heated to a temperature within said range and for urging the products of combustion transversely through the remaining portions of said layer, the temperature at which the combustion of said mixture is initiated in the presence of heated pellets being below 2200° F., said combustion of said mixture effecting movement of said burning zone portion progressively transversely through the entire layer from said surface thereof while maintaining the pellets in said burning zone portion at a temperature ranging from about 2200° F. to 2450° F. in an oxidizing atmosphere.

5. A method of successively heat hardening all portions of a mass of concentrated iron ore pellets without admixed fuel, said pellets containing insufficient combustible components to sustain combustion without the application of external heat, said method comprising the steps of forming the pellets into a generally horizontal layer having gas interstitial permeability, causing a hot flame to penetrate a surface of said layer and establish in said layer a burning zone portion initially positioned adjacent said surface to a high temperature range of about 2200° F. to 2450° F., and subsequently passing a lean low temperature mixture, said mixture containing approximately 0.6% propane and 99.4% air by volume at substantially atmospheric temperature so that the combustion of said mixture is nonself-propagating at atmospheric temperature, under pressure transversely into said burning zone portion for heating said mixture and then effecting combustion thereof in the presence of pellets heated to a temperature within said range and for urging the products of combustion transversely through the remaining portions of said layer, said combustion of said mixture effecting movement of said burning zone portion progressively transversely through the entire layer from said surface thereof while maintaining the pellets in said burning zone portion at a temperature ranging from about 2200° F. to 2450° F. in an oxidizing atmosphere.

References Cited in the file of this patent

UNITED STATES PATENTS

| | | |
|---|---|---|
| 2,356,024 | Andersen et al. | Aug. 15, 1944 |
| 2,696,432 | Davis | Dec. 7, 1954 |

FOREIGN PATENTS

| | | |
|---|---|---|
| 27,762 | Great Britain | of 1912 |

OTHER REFERENCES

The Iron Age, March 2, 1944, article by Cover, pages 46–49.

Journal of Metals, vol. 1, issue No. 11, pages 834–837, November 1949, article by Stanley et al.